No. 710,862. Patented Oct. 7, 1902.
M. B. HAMMOND & T. P. TAYLOR.
HOOK FOR ATTACHING HOSE SUPPORTERS TO CORSETS.
(Application filed July 29, 1902.)
(No Model.)

WITNESSES:
H. A. Lamb
M. J. Lougden

INVENTORS
M. B. Hammond
T. P. Taylor
BY 
ATTORNEY

THE NORRIS PETERS CO., PHOTO-LITHO., WASHINGTON, D. C.

UNITED STATES PATENT OFFICE.

MYRON B. HAMMOND AND THOMAS P. TAYLOR, OF BRIDGEPORT, CONNECTICUT.

HOOK FOR ATTACHING HOSE-SUPPORTERS TO CORSETS.

SPECIFICATION forming part of Letters Patent No. 710,862, dated October 7, 1902.

Application filed July 29, 1902. Serial No. 117,492. (No model.)

*To all whom it may concern:*

Be it known that we, MYRON B. HAMMOND and THOMAS P. TAYLOR, citizens of the United States, residing at Bridgeport, in the county of Fairfield and State of Connecticut, have invented certain new and useful Improvements in Hooks for Attaching Hose-Supporters to Corsets; and we do hereby declare the following to be a full, clear, and exact description of the invention, such as will enable others skilled in the art to which it appertains to make and use the same.

Our invention has reference to hooks for attaching hose-supporters to corsets, and has for its object to provide devices of this description which may be attached to a corset-busk at points remote from the elements of the corset-clasp, so that the stocking-engaging members of the hose-supporter may be suspended directly from the corset-busk without any strain whatever on the corset-clasp.

With these ends in view our invention consists in the details of construction and adaptation of parts, such as will be hereinafter fully set forth and then specifically be designated by the claims.

Figure 1:
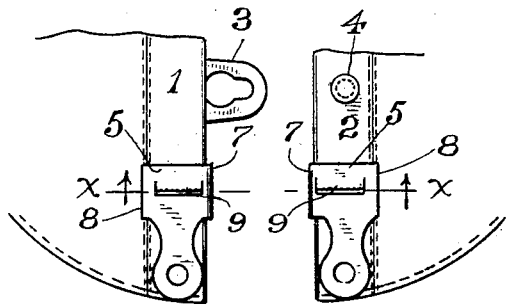
Figure 2:
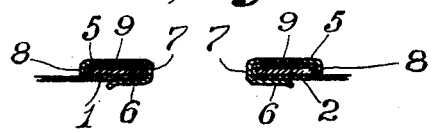
Figure 3:
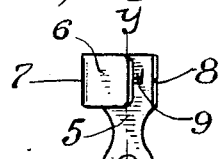
Figure 4:
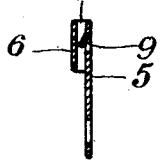
Figure 5:
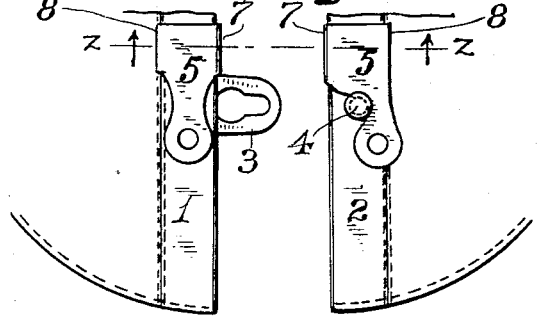
Figure 6:
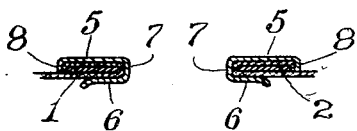
Figure 6:

In the accompanying drawings, which form a part of this application, Figure 1 is a front elevation showing a portion of the front sections of a corset with our improved hooks in position thereon; Fig. 2, a section at the line *x x* of Fig. 1; Fig. 3, a detail rear elevation of our improved hook; Fig. 4, a section at the line *y y* of Fig. 3; Fig. 5, a view similar to Fig. 1, but showing a modified form of our improvement, such as is adapted to be secured to the corset-busks in such position as to rest upon the elements of the corset-clasp; and Fig. 6, a section at the line *z z* of Fig. 5.

Similar numbers of reference denote like parts in the several figures of the drawings.

Heretofore hose-supporter hooks have been provided which attached directly to either the loop or the stud of a corset-clasp or which embrace the corset-busks in front and rear and rest upon the corset-clasp elements; but our invention is distinguished from these prior constructions in that its main object is to provide a device which may be firmly secured to the corset-busks at any location thereof and at points remote from the elements of the corset-clasp.

1 2 are the corset-busks, 3 the loop of the corset-clasp, and 4 the stud of such clasp.

Our improvement is made from sheet metal and comprises a front or body portion 5 and a rear plate 6, parallel to the front portion and joined to the front portion at the outer edge thereof by means of a flange 7. In other words, this rear plate is formed and brought into position by bending rearwardly a tongue-like extension at the outer edge of the portion 5. The inner edge of the front portion 5 terminates in a lip 8, which extends rearwardly at right angles to said portion. The distance between said lip and flange is slightly greater than the width of the corset-busk, so that when our improvement is in position for use the busk will be embraced in front and rear by the portions 5 6, while the flange and lip will snugly embrace the busk at the lateral edges thereof, as will presently be more fully explained.

9 is a tongue, which is cut from the plate 5 and forced inwardly, the edge of said tongue being preferably serrated. In applying our improvement the latter is forced onto the busk until the lip 8 is disposed behind the inner edge of the busk, so that any pull or strain on the device will not cause the latter to slip.

In applying our improvement to the corset-busk the tongue will not mar the fabric surface of the busk, since the lip will rest upon the face of the busk and keep the tongue clear therefrom until said lip snaps into position behind the inner edge of the busk.

Since the busk is confined at its lateral edges between the flange 7 and the lip 8, there can be no rocking of our improvement such as would cause the tongue to gradually tear loose from the fabric surface of the busk.

In case our improvement is to be applied to the corset-busks so as to rest upon the elements of the corset-clasp, as shown at Fig. 5, the tongues can, of course, be omitted, since they are in reality gripping devices for preventing the slipping of our improved hook, and of course devices of this sort would be unnecessary when our improvement is to be used in the manner shown at Fig. 5. In this construction (shown at Fig. 5) the hooks each comprise the front portion 5, the rear plate 6, and the lip 8, all as above described, and the hook which engages with the loop of the clasp is applied in the same manner as the corresponding hook shown at Fig. 1, except that the lower portion of the flange 7 rests immediately upon the loop 3, while the hook that is intended to engage with the stud of the corset is cut away in its front edge below the flange 7, so that when the plate 6 and lip 8 are properly engaged upon the busk 2 the edge of the front plate 5 immediately below the flange 7 will rest upon the stud 4.

We do not wish to be limited to the provision of any particular location or form of tongue, since any suitable gripping means will answer the purposes of our invention.

We have shown in the drawings our improvement applied in duplicate, one to each corset-busk at the front section of the corset, since the most approved form of hose-supporters at the present time is that which contemplates separate attachments to a corset for each stocking of the wearer, so that the hooks applied to the corset need not be detached when the corset is taken off; but of course a single one of our improved hooks may be attached to one of the corset-busks and the hose-supporters for both stockings suspended therefrom.

We have not shown the stocking-engaging members, since they form no part of our present invention, and we would merely say that the hose-supporter elements proper may be secured to the hooks by means of eyelets in the usual manner, or the bottoms of the hooks may be so constructed as to enable the stocking-engaging members to be attached thereto in a different manner.

Having thus described our invention, what we claim as new, and desire to secure by Letters Patent, is—

1. In a stocking-supporter, the hook adapted to be connected with the stocking-engaging elements, said hook being provided with means for engaging the corset-busk at points remote from the corset-clasp devices, whereby the hose-supporter may be suspended directly from said busk and independent of said devices, substantially as set forth.

2. In a stocking-supporter, the hook adapted to be connected with the stocking-engaging elements, said hook consisting of parallel front and rear portions and an inwardly-extending gripping device, said portions adapted to embrace the busk of a corset while the gripping device engages the fabric which covers the busk, substantially as set forth.

3. In a stocking-supporter, the integral hook comprising parallel front and rear plates connected at the outer edge by a flange, the inner edge of the front plate terminating in a lip which extends inwardly at right angles to said plate, whereby the device when applied to a corset-busk will embrace the latter in front and rear and at the lateral edges, substantially as set forth.

4. In a stocking-supporter, the hook comprising parallel front and rear plates that are connected at the outer edge by a flange, the face of the front plate having cut therefrom an inwardly-extending tongue, while the inner edge of said front plate terminates in a lip which extends rearwardly at right angles to said front plate, substantially as set forth.

In testimony whereof we affix our signatures in presence of two witnesses.

MYRON B. HAMMOND.
THOMAS P. TAYLOR.

Witnesses:
F. W. SMITH, Jr.,
M. T. LONGDEN.